United States Patent [19]
Kimura et al.

[11] Patent Number: 4,824,344
[45] Date of Patent: Apr. 25, 1989

[54] SCROLL-TYPE COMPRESSOR WITH OIL PASSAGEWAY IN THRUST BEARING

[75] Inventors: Tadashi Kimura; Tsutomu Inaba; Masahiro Sugihara; Norihide Kobayashi, all of Wakayama, Japan

[73] Assignee: Mitsubishi Denki Kabushiki Kaisha, Japan

[21] Appl. No.: 113,982

[22] Filed: Oct. 29, 1987

[30] Foreign Application Priority Data

Nov. 5, 1986 [JP] Japan ................... 61-263147
Apr. 8, 1987 [JP] Japan ................... 62-87416

[51] Int. Cl.⁴ ............... F04C 18/04; F04C 29/02; F16C 33/10
[52] U.S. Cl. ............................ 418/55; 418/94; 384/369
[58] Field of Search ................. 418/55, 57, 94; 384/369

[56] References Cited

U.S. PATENT DOCUMENTS

| | | | |
|---|---|---|---|
| 4,065,279 | 12/1977 | McCullough | 62/510 |
| 4,488,855 | 12/1984 | Butterworth et al. | 417/368 |
| 4,496,293 | 1/1985 | Nakamura et al. | 417/371 |
| 4,553,913 | 11/1985 | Morishita et al. | 418/55 |
| 4,592,703 | 6/1986 | Inaba et al. | 417/366 |
| 4,637,786 | 1/1987 | Matoba et al. | 418/94 |
| 4,655,697 | 4/1987 | Nakamura et al. | 418/55 |

FOREIGN PATENT DOCUMENTS 300129 9/1954 Switzerland ................... 384/369

Primary Examiner—John J. Vrablik
Attorney, Agent, or Firm—Leydig, Voit & Mayer

[57] ABSTRACT

A scroll-type compressor is disclosed which has a novel thrust bearing for supporting an orbiting scroll. The thrust bearing is annular and is supported by a bearing support frame which has a plurality of oil return holes formed therein. The diameter of the thrust bearing is smaller than the diameter of the orbiting scroll and of an Oldham coupling which guides the orbiting scroll. The thrust bearing has a plurality of oil passageways for lubricating oil formed therein whose inner ends open onto the central hole and whose outer ends communicate with the oil return holes and do not extend to the outer periphery of the bearing. The oil passageways are always covered by the orbiting scroll. In one form of the invention, the oil passageways are in the form of grooves formed in the upper surface of the bearing and through holes which communicate between the outer ends of the grooves and the oil return holes. In another form of the invention, the oil passageways are slits formed through the depth of the bearing. In another form of the invention, the oil passageways are a combination of slits formed through the depth of the bearing, through holes which communicate with the oil return holes, and grooves formed in the upper surface of the bearing which extend between the slits and the through holes.

12 Claims, 10 Drawing Sheets

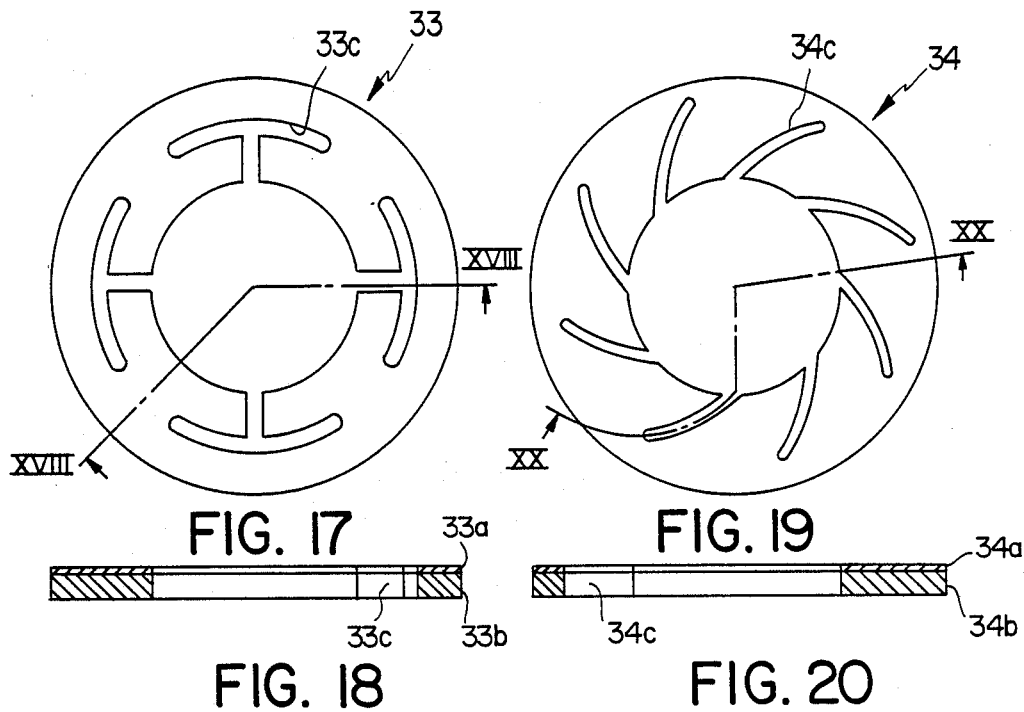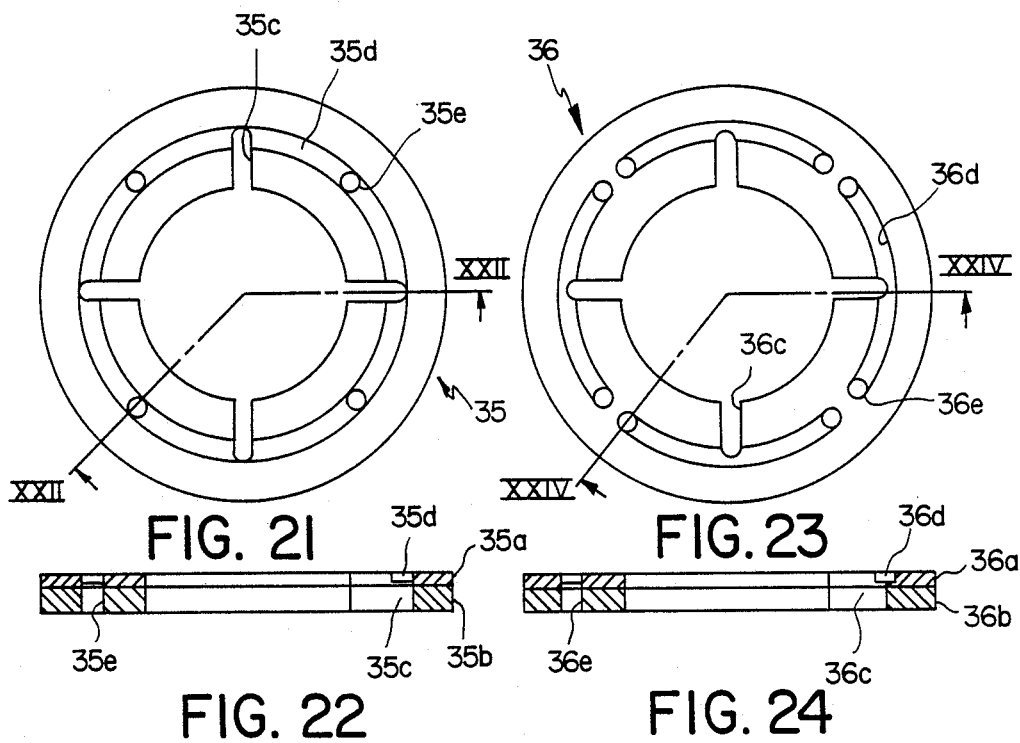

SCROLL-TYPE COMPRESSOR WITH OIL PASSAGEWAY IN THRUST BEARING

BACKGROUND OF THE INVENTION

This invention relates to a scroll-type positive displacement machine, and more particularly, it relates to a scroll-type compressor which is equipped with a novel thrust bearing and which is suitable for use as a compressor for an air conditioner or refrigeration apparatus.

A scroll-type compressor is a positive displacement rotary compressor comprising two interfitting elements generally referred to as scrolls. Each scroll comprises a disk-shaped end plate and a thin-walled member, generally referred to as a spiral wrap, which projects perpendicularly from one surface of the end plate and curves outwards from the center of the end plate in the shape of an involute or other type of spiral. The two scrolls are disposed with the end plates parallel and the spiral wraps interfitting with one another so as to be in line contact with one another at a plurality of locations. The surfaces of the end plates and the spiral wraps thereby define a plurality of spiral compression chambers between the locations of line contact between the spiral wraps. If the scrolls are rotated with respect to one another in the proper direction while maintaining the line contact between the spiral wraps, the compression chambers are gradually moved towards the centers of the scrolls with an accompanying decrease in volume. A working fluid is introduced into the compression chambers via a suction port formed in the outer periphery of one of the scrolls and is then removed at a higher pressure from a discharge port formed in the center of the end plate of one of the scrolls.

FIG. 1 is a vertical cross-sectional view of a conventional completely-enclosed scroll-type compressor of the type to which the present invention pertains. The illustrated compressor is like that disclosed in Japanese Laid-Open Patent Application No. 58-117380 and is designed for use as part of a refrigeration apparatus. As shown in this figure, a stationary scroll 1 and an orbiting scroll 2 are housed with a hermetically-sealed shell 12. The stationary scroll 1 has a disk-shaped end plate 1a on the bottom side of which a perpendicularly-extending spiral wrap 1b is formed. The spiral wrap 1b has the transverse cross-sectional shape of an involute. Two diametrically-opposed suction ports 3 are formed in the outer periphery of the spiral wrap 1b of the stationary scroll 1. A discharge port 4 which extends between the top and bottom sides of the end plate 1a is formed at the center thereof. The discharge port 4 is connected to a discharge pipe 17 which penetrates the top of the sealed shell 12.

Likewise, the orbiting scroll 2 comprises a disk-shaped end plate 2a and a spiral wrap 2b which is formed on and extends perpendicularly from the top side of the end plate 2a. The spiral wrap 2b has the same transverse cross-sectional shape as the spiral wrap 1b of the stationary scroll 1, and it interfits with the stationary spiral wrap 1b so as to form a plurality of spiral compression chambers 5 which extend partway around the centers of the scrolls. A short shaft 2c is formed on the bottom surface of the end plate 2a and extends perpendicularly from the center thereof. The moving end plate 2a is eccentric with respect to the stationary end plate 1a.

The stationary scroll 1 is secured by unillustrated bolts to an upper bearing frame 8 which is secured to the inner surface of the sealed shell 12 by press fitting, shrink fitting, or other suitable method. The upper bearing frame 8 has a circular depression 8a formed at the center of its upper surface, and a step 8b which is raised slightly above the rest of the depression 8a is formed at the center thereof. A longitudinally-extending through hole is formed at the center of the frame 8. The depression 8a houses an upper thrust bearing 21 which bears the weight of the orbiting scroll 2 and an Oldham coupling 13. The upper thrust bearing 21 sits atop the step 8b, while the Oldham coupling is supported by the bottom of the depression 8a to the outside of the step 8b. The upper thrust bearing 21 is an annulus whose outer diameter is slightly smaller than the diameter of the depression 8a so that there is a small gap between the outer periphery of the upper thrust bearing 21 and the inner walls of the depression 8a. The Oldham coupling 13 has a pair of keys 13a which slidingly engage with corresponding grooves formed in the bottom side of the moving end plate 2a. The Oldham coupling 13 enables the orbiting scroll 2 to orbit around the center of the stationary scroll 1 without rotating on its own axis. A number of longitudinally-extending oil return holes 25 are formed in the upper bearing frame 8 between the depression 8a and the bottom surface of the upper bearing frame 8, and a longitudinally-extending suction passageway 28 is formed in its outer periphery, the upper end of the suction passageway 28 communicating with the suction ports 3.

A lower bearing frame 8 is disposed immediately below the upper bearing frame 8 and is secured to the inner surface of the sealed shell 12. The two bearing frames 8 and 9 are secured to one another by a faucet joint. The lower bearing frame 9 has a hole at its center through which a drive shaft 6 extends. The drive shaft 6 has a large-diameter portion 6a formed at its upper end, below which a counterweight 6d is formed. The weight of the drive shaft 6 and axial loads are carried by a lower thrust bearing 22 which is formed on the upper surface of the lower bearing frame 9. The large-diameter portion 6a of the drive shaft 6 is journalled by an upper journal bearing 19 which is secured to the inside of the hole at the center of the upper bearing frame 8, while the midportion of the drive shaft 6 is journalled by a lower journal bearing 20 which is secured to the inner surface of the hole at the center of the lower bearing frame 9. A longitudinally-extending eccentric hole 6b is formed in the top of the large-diameter portion 6a, and the shaft 2c of the orbiting scroll is journalled by a moving journal bearing 18 which fits tightly into the eccentric hole 6b. An oil supply hole 6c in the form of a longitudinally-extending, eccentric through hole is formed in the drive shaft 6 between the bottom end of the drive shaft 6 and the bottom end of the eccentric hole 6b. The lower end of the drive shaft 6 has an oil cup 7 having an inlet port 7a fitted thereon. The oil cup 7 is immersed in lubricating oil 15 which fills the bottom of the sealed shell 12. A longitudinally-extending suction passageway 28 is formed in the outer periphery of the lower bearing frame 9. Its lower end opens onto the inside of the sealed shell 12 while its upper end communicates with suction passageway 28 in the upper bearing frame 8. A plurality of oil return passageways 26 are also formed in the outer periphery of the lower bearing frame 9 between its top and bottom sides.

The drive shaft 6 is rotated by an electric motor comprising a rotor 10 which is coaxially mounted on the lower end of the drive shaft 6, and a stator 11 which is secured to the lower bearing frame 9. A plurality of suction passageways 27 are formed in the inner surface of the lower bearing frame 9 to enable working fluid to flow between the lower bearing frame 9 and the stator 11.

A working fluid to be compressed is introduced through a suction pipe 16 which is mounted on the outside of the sealed shell 12 and communicates with a cavity 9a formed in the underside of the lower bearing frame 9 above the motor. As shown by the solid arrows in FIG. 1, the working fluid flows from the suction pipe 16 into the cavity 9a of the lower bearing frame 9. Some of the working fluid flows down the entire length of the motor, while the rest flows through the suction passageways 27 in the lower bearing frame 9. The working fluid then flows upwards through the suction passageways 28 in the bearing frames 8 and 9 and then enters the scrolls through the suction ports 3.

The operation of the illustrated compressor is as follows. When the drive shaft 6 is rotated by the motor, the orbiting scroll 2 is made to orbit around the center of the stationary scroll 1 while being prevented from rotating on its axis by the Oldham coupling 13. Working fluid, shown by the solid arrows, is drawn into the sealed shell 12 through the suction pipe 16, and after cooling the motor windings, it enters the compression chambers 5 formed between the two scrolls via the suction passageways 28 and the suction ports 3. As the orbiting scroll 2 orbits about the center of the stationary scroll 1, the compression chambers 5 are progressively moved around the center of the stationary scroll 1, and as they are moved they decrease in volume, thereby compressing the working fluid. When the working fluid reaches the center of the stationary scroll 1, it is discharged under pressure through the discharge port 4 and the discharge pipe 17 to a high-pressure portion of the refrigeration apparatus of which the compressor is a part.

At the same time, the rotation of the drive shaft 6 causes lubricating oil 15 to be drawn upwards from the bottom of the sealed shell 12 through the oil supply hole 6c. As shown by the dashed arrows in FIG. 1, the lubricating oil 15 is supplied to the upper thrust bearing 21 and the Oldham coupling 13 by way of the eccentric hole 6b in the drive shaft 6. The oil 15 then returns to the bottom of the sealed shell 12 via oil return holes 25 and 26 formed in the bearing frames.

FIGS. 2 and 3 are respectively a plan view and a vertical cross-sectional view of a typical upper thrust bearing 21 for a compressor like that shown in FIG. 1. It is in the form of an annulus and generally has a two-layer structure comprising a bearing layer 21a made of an aluminum alloy, polytetrafluoroethylene, or other suitable bearing material, and a metal backing 21b which is made of rolled steel plate and is secured to the bearing layer 21a by contact bonding or other suitable method. The bearing layer 21a has a plurality of radially-extending grooves 21c formed therein which extend between the hole at the center of the bearing 21 and an annular groove 21d which is concentric with the hole at the center of the bearing 21. A plurality of oil return holes 21e are formed in the annular groove 21d at equal intervals, and a pair of diametrically-opposed notches 21f for the keys 13a of the Oldham coupling 13 are formed in the outer portion of the bearing 21 on the outside of the annular groove 21d. These notches 21f are provided so that the bearing 21 will not interfere with the movement of the Oldham coupling 13. Lubricating oil 15 which is pumped into the eccentric hole 6b of the drive shaft 6 via the oil supply hole 6c flows from the central hole of the upper thrust bearing 21 into the radially-extending grooves 21c, the annular groove 21d, and the oil return holes 21e. In doing so, it lubricates the upper surface of the bearing 21 and the lower surface of the end plate 2a of the orbiting scroll 2.

The lubricating oil 15 flows from the oil return holes 21e into the depression 8a of the upper bearing frame 8. As shown in FIG. 1, there is only a small gap between the outer periphery of the thrust bearing 21 and the inner wall of the depression 8a. Accordingly, most of the oil which enters the depression 8a through the oil return holes 21e returns to the bottom of the sealed shell 12 via oil return holes 25 and 26 formed in the bearing frames 8 and 9. However, due to the presence of the notches 21f for the keys 13a of the Oldham coupling 13 in the outer periphery of the upper thrust bearing 21, it is impossible to completely isolate the bottom portion of the depression 8a from the suction port 3 of the stationary scroll 1. Furthermore, although the gap between the outer periphery of the upper thrust bearing 21 and the depression 8a is small, due to the difficulty of machining a large thrust bearing 21 to high tolerances, the gap is still large enough to allow a significant amount of lubricating oil to leak through it. Accordingly, an undesirably large amount of the oil which enters the depression 8a via the upper thrust bearing 21 is sucked into the compression chambers 5 via the suction ports 3 and is discharged from the compressor together with working fluid.

Furthermore, as shown in FIG. 2, the size of the thrust bearing 21 is larger than is required for it to support the orbiting scroll 2, and it is therefore unnecessarily expensive to manufacture.

SUMMARY OF THE INVENTION

It is therefore an object of the present invention to provide a scroll-type compressor which is equipped with a novel thrust bearing which can decrease the amount of lubricating oil which enters the compression chambers of the compressor.

It is another object of the present invention to provide a scroll-type compressor which is equipped with a novel thrust bearing which is cheaper to manufacture than a conventional thrust bearing.

A scroll-type compressor in accordance with the present invention is of the type having a stationary scroll and an orbiting scroll which interfits with the stationary scroll so as to form a plurality of compression chambers. The orbiting scroll is made to orbit around the center of the stationary scroll while being prevented from rotating on its axis. A working fluid is introduced into the compression chambers via suction ports formed in the outer periphery of the stationary scroll and is removed via a discharge port at the center of the stationary scroll. The orbiting scroll is supported by the top surface of a novel, annular thrust bearing which in turn is supported by a bearing frame. The bearing frame has a plurality of oil return holes formed therein. The upper ends of the oil return holes are surrounded by the bottom surface of the thrust bearing, and the bottom surface of the thrust bearing is in intimate contact with the bearing frame at least in a region which surrounds all the oil return holes. The thrust bearing has a plurality of oil passageways formed in its top surface which communicate between the central hole of the thrust bearing and the oil return holes in the bearing frame and which do not extend to the outer periphery of the thrust bearing. The diameter of the thrust bearing is smaller than the diameter of the orbiting scroll, and the upper surface of the bearing is always covered by the bottom surface of the orbiting scroll, at least in the portion in which the oil passageways are formed. Lubricating oil which is introduced into the central hole of the thrust bearing passes through the oil passageways and then is returned to the bottom of the compressor via the oil return holes in the bearing frame. As the oil passes through the oil passageways, it lubricates the thrust bearing and the orbiting scroll. Because the oil passageways do not extend to the outside of the bearing, and because the bottom surface of the bearing is in intimate contact with the bearing frame, lubricating oil can be prevented from leaking from the thrust bearing into the compression chambers of the compressor.

In one form of the present invention, the oil passageways comprise a plurality of through holes which extend through the depth of the bearing and communicate with the oil return holes in the bearing frame, and a plurality of grooves which are formed in the top surface of the bearing partway through the depth of the bearing and which communicate between the central hole of the bearing and the through holes. There is no restriction on the shape of the grooves, and it is only necessary that their inner ends open onto the central hole and that their outer ends not extend to the outer periphery of the bearing.

In another form of the present invention, the oil passageways comprise a plurality of slits which extend through the depth of the bearing. The inner ends of the slits open onto the central hole of the thrust bearing, and some portion of each slit communicates with one of the oil return holes in the bearing frame. Each slit may also be equipped with a weir between the inner end of the slit and the portion of the slit which communicates with an oil return hole. The slits are preferably formed in the bearing by press working.

In yet another form of the present invention, the oil passageways comprise a plurality of through holes which extend through the depth of the bearing and communicate with the oil return holes in the bearing frame, a plurality of slits which extend through the depth of the bearing and whose inner ends open onto the central hole of the bearing and whose outer ends do not extend to the outer periphery of the bearing, and at least one groove which is formed in the surface of the bearing partway through the depth thereof and which extends between the outer ends of the slits and the through holes.

In a preferred embodiment, the bearing has a two-layer structure and comprises a metal backing and a bearing layer which is secured to the metal backing by contact bonding. The bearing layer is made of a bearing material such as an aluminum alloy or polytetrafluoroethylene.

BRIEF DESCRIPTION OF THE DRAWINGS

FIGS. 17 and 18 are respectively a plan view and a vertical cross-sectional view taken along Line XVIII—XVIII of a seventh type of upper thrust bearing of the present invention.

FIGS. 19 and 20 are respectively a plan view and a vertical cross-sectional view taken along Line XX—XX of an eighth type of upper thrust bearing of the present invention.

FIGS. 21 and 22 are respectively a plan view and a vertical cross-sectional view taken along Line XXII—XXII of a ninth type of upper thrust bearing of the present invention.

FIGS. 23 and 24 are respectively a plan view and a vertical cross-sectional view taken along Line XXIV—XXIV of a tenth type of upper thrust bearing of the present invention.

In the figures, the same reference numerals indicate the same or corresponding parts.

DESCRIPTION OF THE PREFERRED EMBODIMENTS

Figure 1:
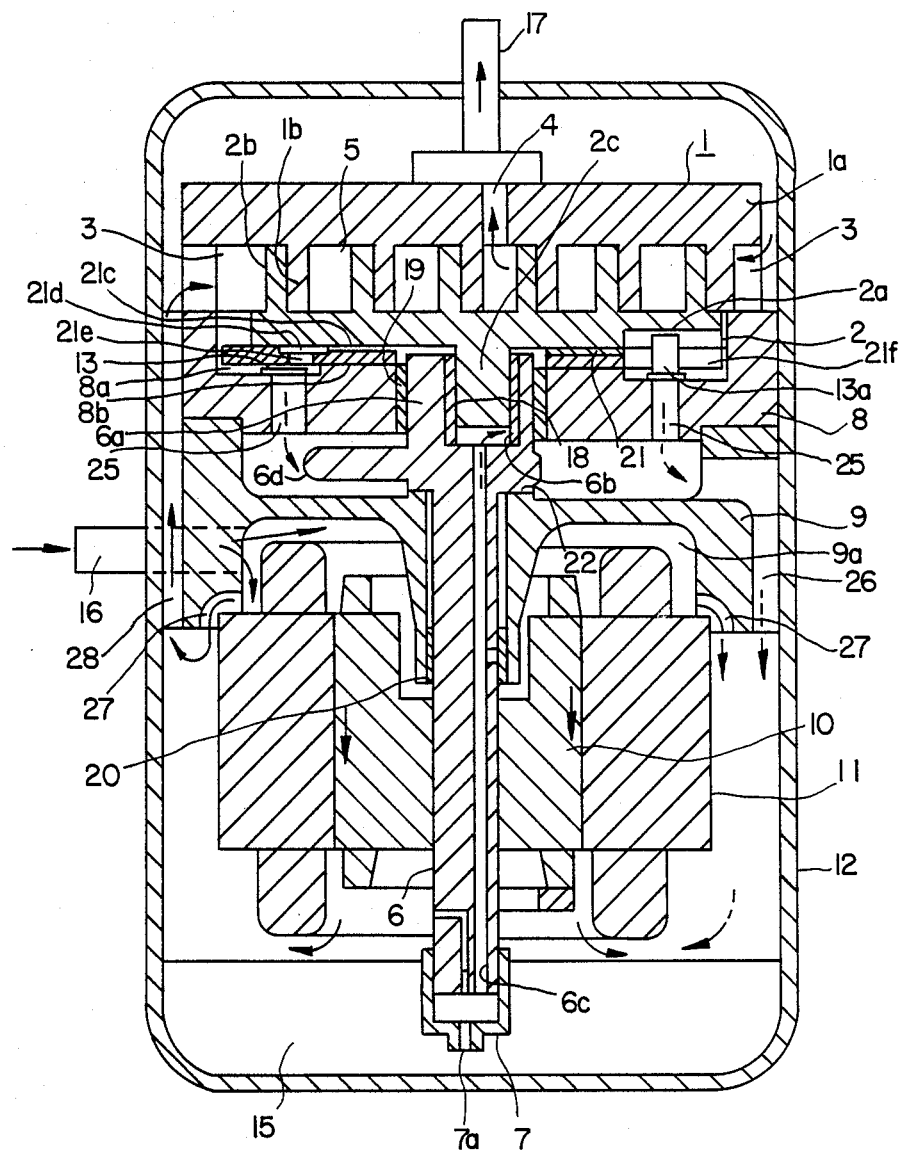
FIG. 1 is a vertical cross-sectional view of a conventional scroll-type compressor.

Hereinbelow, a preferred embodiment of a scroll-type compressor in accordance with the present invention will be described while referring to the accompanying drawings, FIG. 4 of which is a vertical cross-sectional view thereof. The structure of this embodiment is similar to that of the conventional compressor of FIG. 1 and differs therefrom in regards to the structure of an upper thrust bearing 30 for supporting an orbiting scroll 2. The structure of the upper thrust bearing 30 is shown in detail in FIGS. 5 and 6, which are respectively a plan view and a vertical cross-sectional view thereof.

The upper thrust bearing 30 is a two-layer annulus comprising a bearing layer 30a made of a conventional bearing material such as an aluminum alloy or polytetrafluoroethylene, and a metal backing 30b which is secured to the bearing layer 30a by contact bonding. A plurality of outwardly-extending grooves 30c are formed in the top surface of the bearing 30 between the hole at the center of the bearing 30 and an annular groove 30d which extends concentrically around the bearing 30. A plurality of through holes 30e are formed in the annular groove 30d through the depth of the bearing 30 in positions corresponding to the locations of the oil return holes 25 in the upper bearing frame 8.

The top and bottom surfaces of the thrust bearing 30 are flat, and the entirety of its bottom surface is in intimate contact with the top surface of the depression 8a of the bearing frame 8 so that oil can not leak therebetween to the outside of the bearing 30. In this embodiment, the depression 8a of the upper bearing frame 8 is completely flat and does not have a step 8b like the depression 8a of FIG. 1. However, so long as there is intimate contact between the bottom surface of the thrust bearing 30 and the bearing frame 8 in a region surrounding all the oil return holes 25, the exact shape of the depression 8a or of the bottom surface of the thrust bearing 30 does not matter. The diameter of the bearing 30 is smaller than the diameter of the end plate 2a of the orbiting scroll 2. Furthermore, the diameter of the thrust bearing 30 is such that at least those portions of the thrust bearing 30 lying within the outer periphery of the annular groove 30d are at all times covered by the bottom surface of the end plate 2a. In addition, the diameter of the thrust bearing 30 is sufficiently smaller than the inner diameter of the Oldham coupling 13 so that it will not interfere with the sliding motion of the coupling 13.

In order for lubricating oil to be supplied to those portions of the top surface of the thrust bearing 30 which surround the outside of the annular groove, 30d, it is desirable that the distance in the radial direction from the outer periphery of the annular groove 30d to the outer periphery of the thrust bearing 30 be less than the diameter of the orbit of the orbiting scroll 2 as it orbits about the stationary scroll 1. In other words, if D1 is the orbital diameter of the orbiting scroll 2, D2 is the outer diameter of the annular groove 30d, and D3 is the outer diameter of the thrust bearing 30, then $(D3-D2)/2 < D1$.

Figure 2:
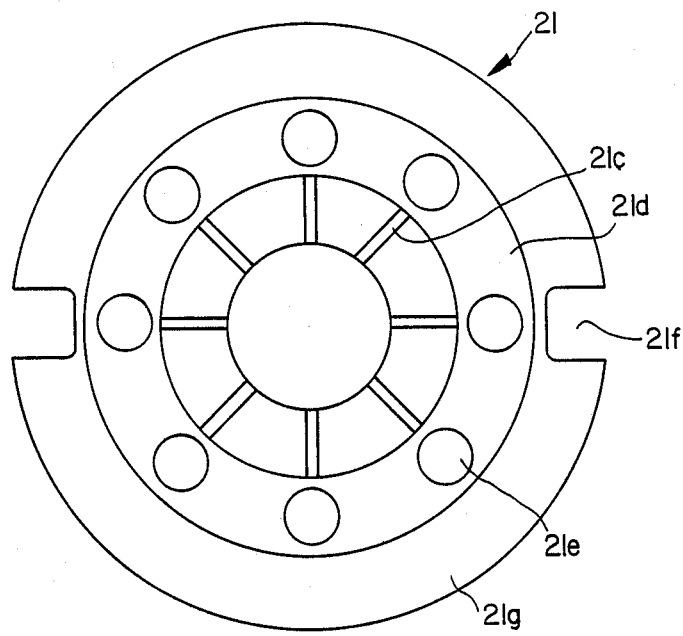
FIG. 2 is a plan view of the upper thrust bearing of the compressor of FIG. 1.
Figure 3:
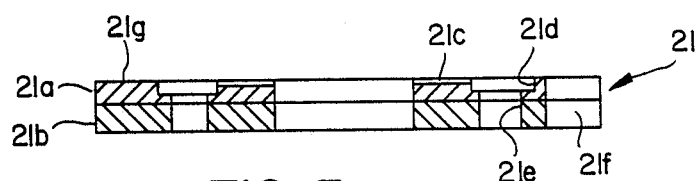
FIG. 3 is a vertical cross-sectional view of the upper thrust bearing of FIG. 2.

The operation of this embodiment is basically the same as that of the embodiment of FIG. 1. When the orbiting scroll 2 is being rotated by the motor, lubricating oil 15 which is introduced into the central hole of the upper thrust bearing 30 through the oil supply hole 6c and the eccentric hole 6b of the drive shaft 6 enters the outwardly-extending grooves 30c and then flows through the annular groove 30d and the through holes 30e directly into the oil return holes 25 of the upper bearing frame 8 without accumulating in the depression 8a of the upper bearing frame 8. Except for a minute quantity of oil which leaks to the outside of the upper thrust bearing 30 via the gap between the upper surface of the bearing 30 and the bottom surface of the end plate 2a of the orbiting scroll 2, all of the lubricating oil 15 which is supplied to the upper thrust bearing 30 is returned to the bottom of the shell 12 via oil return holes 25 and 26. Therefore, the amount of lubricating oil which enters the compression chambers 5 and is compressed together with the working fluid is greatly decreased. The diameter of the thrust bearing 30 is smaller than the diameter of the conventional thrust bearing 21 of FIG. 2, and it is not necessary to form notches 21f therein to prevent it from interfering with the movement of the Oldham coupling 13. Therefore, it can be more cheaply manufactured than the conventional thrust bearing 21 of FIG. 2.

Figure 4:
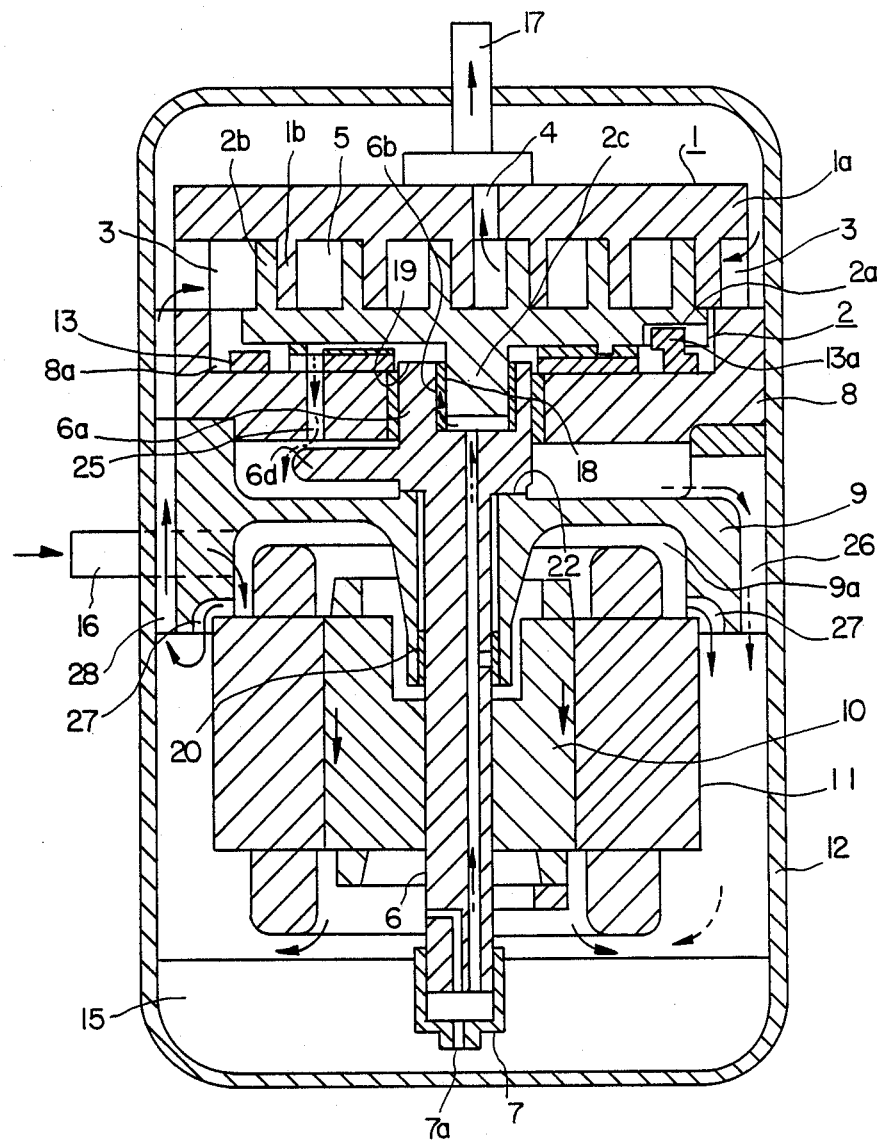
FIG. 4 is a vertical cross-sectional view of an embodiment of a scroll-type compressor in accordance with the present invention.
Figure 5:
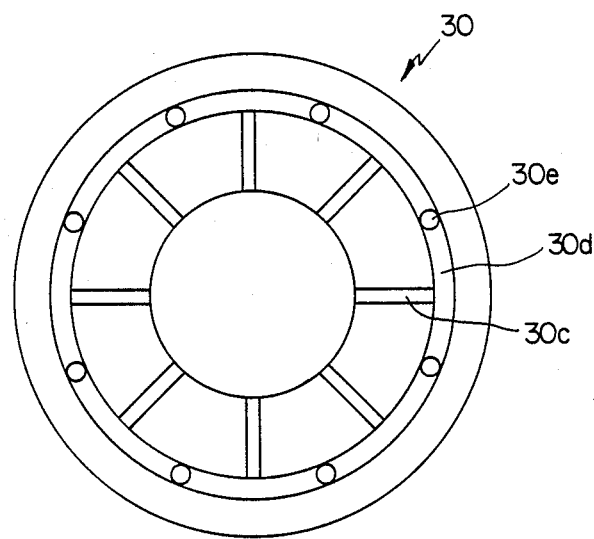
FIGS. 5 and 6 are respectively a plan view and a vertical cross-sectional view of the upper thrust bearing of the embodiment of FIG. 4.
Figure 6:
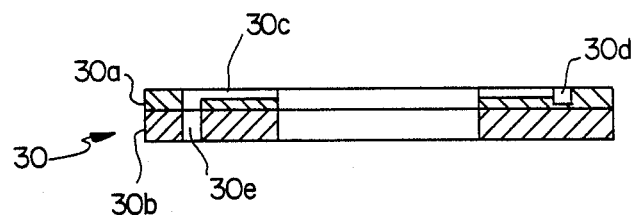
Figure 7:
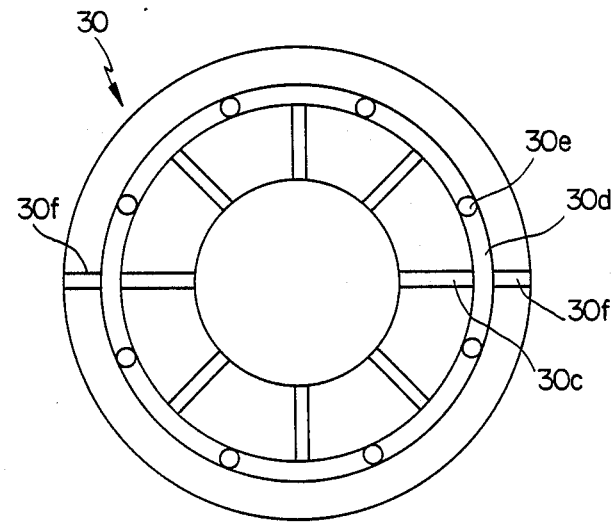
FIGS. 7 and 8 are respectively a plan view and a vertical cross-sectional view of an upper thrust bearing of a second type of upper thrust bearing which can be employed in the present invention.
Figure 8:
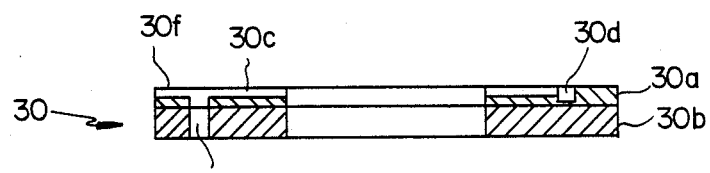

FIGS. 7 and 8 are a plan view and a vertical cross-sectional view of a slightly different thrust bearing 30 which can be employed in a compressor of the present invention in place of the thrust bearing of FIG. 5. It differs from the thrust bearing 30 of FIG. 5 in that is further equipped with two diametrically-opposed oil by-passes 30f in the form of radial grooves which extend outwards from the annular groove 30d to the outer surface of the bearing 30. These by-passes 30f permit a small amount of lubricating oil to leak from the annular groove 30d to the outside of the bearing 30, from where it is sucked into the suction ports 3 of the stationary scroll 1. The dimensions of the by-passes 30f are chosen so that they will supply the necessary amount of oil to lubricate the scrolls and seal any gaps between them. The structure and operation of this embodiment is otherwise identical to that of the embodiment of FIG. 4.

Figure 9:
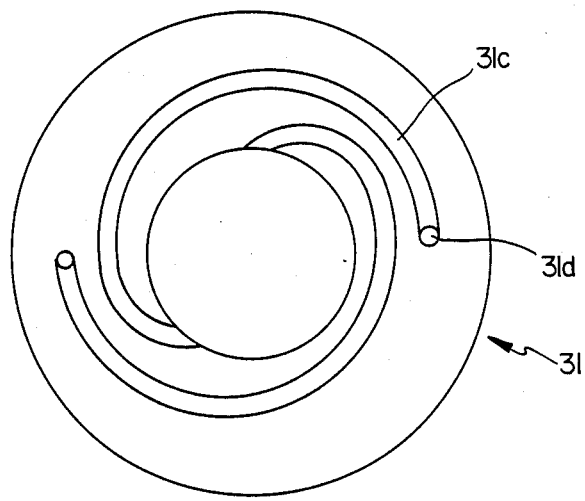
FIGS. 9 and 10 are respectively a plan view and a vertical cross-sectional view of a third type of upper thrust bearing of the present invention.
Figure 10:
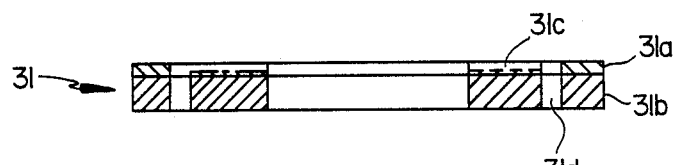

FIGS. 9 and 10 are respectively a plan view and a vertical cross-sectional view of another type of upper thrust bearing 31 which can be used in place of the upper thrust bearing 30 of FIG. 4. It is an annular member comprising a bearing layer 31a and a metal backing 31b which is secured to the bearing layer 31a by contact bonding. The bearing layer 31a has a pair of spiral grooves 31c formed therein which extend between the hole at the center of the bearing 31 and a pair of through holes 31d which extend from the top to the bottom of the bearing 31. The bearing 31 is mounted on the depression 8a of FIG. 4 so that the through holes 31d are aligned with the oil return holes 25 in the upper bearing frame 8. Although the illustrated bearing 31 has only two spiral grooves 31c, as long as each groove 31c opens onto the central hole of the bearing 31 and a through hole 31d and does not extend to the outer periphery of the bearing 31, there is no limit on the number of grooves 31c.

As described above, the bearing layer of the thrust bearings illustrated in FIGS. 5–10 is generally made of an aluminum alloy or a resin such as polytetrafluoroethylene. If the bearing layer is an aluminum alloy and the depth of the grooves in the surface of the bearing layer is less than or equal to the depth of the bearing layer, the grooves are generally formed by press working. If the depth of the grooves is greater than the depth of the bearing layer, or if the bearing layer is made of a resin, the grooves are generally formed by cutting with a machine tool.

First, the case will be considered in which the grooves are formed by press working. Generally the thickness of the bearing layer at the time that it is contact bonded to the metal backing is approximately 0.6–0.9 mm. If the surface of the bearing layer is then finished, the thickness of the bearing layer is reduced to approximately 0.3–0.6 mm. Accordingly, the maximum depth of grooves which can be formed in the bearing layer by press working is 0.3–0.6 mm. The rate at which oil can be supplied to the surface of the thrust bearing depends on the depth, the width, the length, and the number of grooves formed in the bearing layer. As a depth of 0.3–0.6 mm is a rather shallow, it is necessary either that the width of the grooves be large, that their length be short, or that they be numerous in order to insure an adequate supply of oil. However, as a result, the effective bearing area (the area of the bearing layer minus the area occupied by the grooves) of the thrust bearing ends up being small. Therefore, the surface pressure on the bearing is high, and abnormal wear and damage due to seizing of the thrust bearing may occur.

If the grooves in the surface of the thrust bearing are formed by cutting, there is no restriction on the depth of the grooves, so there are no problems in maintaining an adequate bearing area on the surface of the bearing.

However, cutting is time-consuming and expensive, and may also produce deformations in the thrust bearing.

Figure 11:
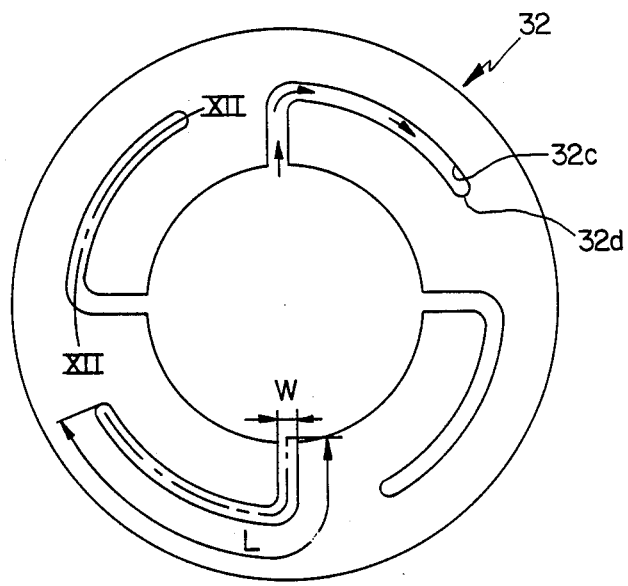
FIGS. 11 and 12 are respectively a plan view and a vertical cross-sectional view taken along Line XII—XII of a fourth type of upper thrust bearing of the present invention.
Figure 12:
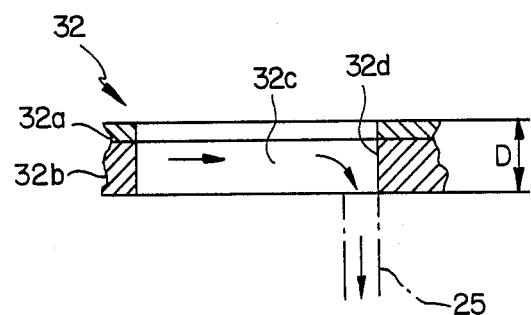

In another form of the present invention, this problem is solved by employing an upper thrust bearing having oil passageways in the form of slits extending through the entire depth of the bearing. One such thrust bearing 32 is illustrated in FIGS. 11 and 12, which are respectively a plan view and a vertical cross-sectional view taken along Line XII—XII. As shown in the figures, the thrust bearing 32 is an annulus comprising a bearing layer 32a and a metal backing 32b which are secured to one another by contact bonding. Four oil-supply slits 32c are formed in the thrust bearing 32 at regular intervals about the center hole of the bearing 32. Each of the slits 32c has a radially-extending portion which opens onto the inside of the center hole of the bearing 32 and a circumferentially-extending portion which extends partway around the bearing 32 from the outer end of the radially-extending portion. The end 32d of each slit 32c coincides with one of the oil return holes 25 formed in the upper bearing frame 8. The slits 32c extend completely through the bearing 32 from top to bottom and can easily be formed by press working. If formed by press working, the width W of the slits 32c is set at the maximum value which can be achieved by press working (generally $W \geq 1.5 \times D$), and the length L of the slits 32c can be chosen arbitrarily.

The arrows in FIGS. 11 and 12 illustrate the flow of lubricating oil through the slits 32c. Oil enters the slits 32c from the center hole of the bearing 32, and after flowing to the outer ends 32d of the slits 32c, it flows downwards through the oil return holes 25 and is returned to the bottom of the shell 12.

Because the depth of the slits 32c is equal to the depth of the bearing 32, the number and width of the slits 32c can be decreased compared to the thrust bearings of the previous embodiments while still maintaining an adequate supply of oil. As a result, the effective bearing area of the bearing 32 is increased, and abnormal wear or seizing due to an excessive load on the bearing 32 can be prevented.

Furthermore, because the slits 32c extend through the depth of the bearing 32, they can be easily and inexpensively formed by press working, regardless of the material constituting the bearing layer 32a.

Figure 13:
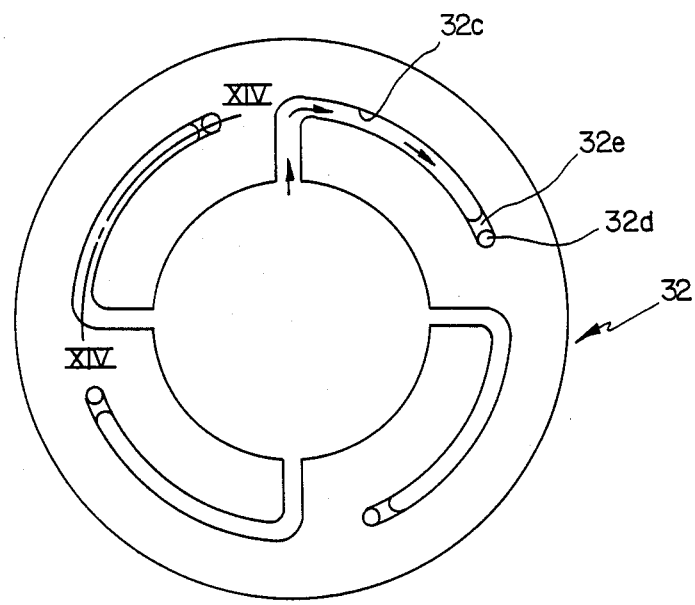
FIGS. 13 and 14 are respectively a plan view and a vertical cross-sectional view taken along Line XIV—XIV of a fifth type of upper thrust bearing of the present invention.
Figure 14:
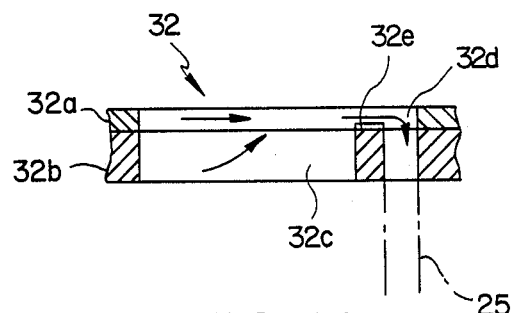

If the motor which rotates the drive shaft 6 is a variable-speed motor, the rate at which oil is supplied to the bearing 32 through the oil supply hole 6c will decrease as the motor speed falls. There is therefore a possibility of there being inadequate lubricating oil in the oil supply slits 32c at low operating speeds. This problem can be solved by the use of a thrust bearing of the type shown in FIGS. 13 and 14, which are respectively a plan view and a vertical cross-sectional view along Line XIV—XIV. This thrust bearing 32 differs from the one of FIG. 11 in that each of the slits 32c is formed in a manner so as to leave a weir 32e in the vicinity of the outer end 32d of the slit 32c. As shown by the arrows in FIG. 14, lubricating oil must flow over the top of the weir 32e in order to enter one of the oil return holes 25 in the upper bearing frame 8. If the motor speed decreases and the oil level in the slits 32c falls, the weirs 32e can still maintain an adequate level of oil in the slits 32 to lubricate the top surface of the bearing 32. For ease of manufacture, if the bearing layer 32a is made of an aluminum alloy or the like, it is desirable that the height of the weir 32e be at least as large as the thickness of the metal backing 32b, whereby the weir 32e can be easily formed by press working. However, the weir 32e can also be easily manufactured by machining.

Figure 15:
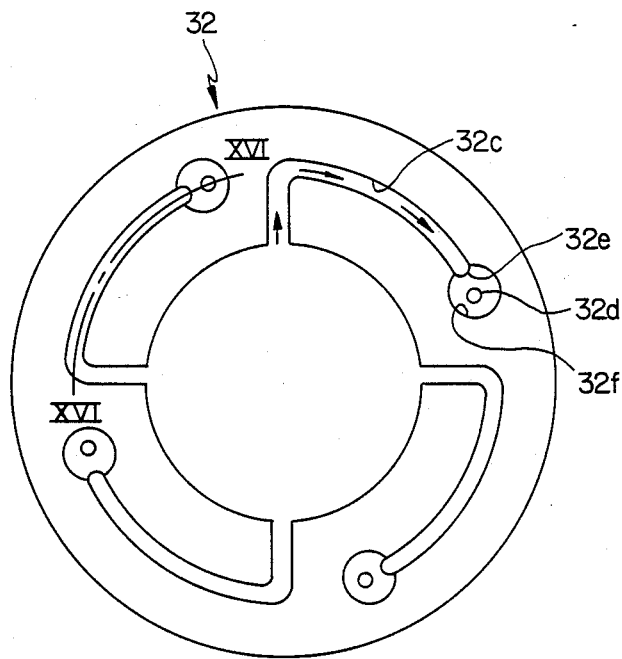
FIGS. 15 and 16 are respectively a plan view and a vertical cross-sectional view taken along Line XVI—XVI of a sixth type of upper thrust bearing of the present invention.
Figure 16:
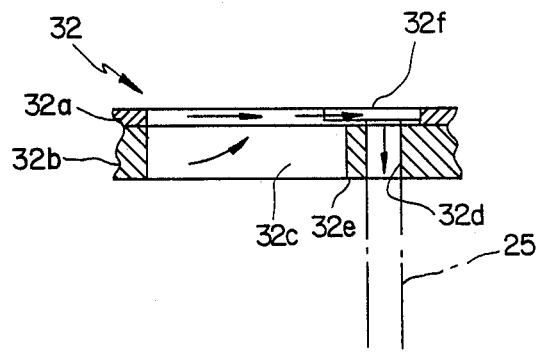

FIGS. 15 and 16 are respectively a plan view and a vertical cross-sectional view taken along Line XVI—XVI of another type of thrust bearing which can be used in a compressor of the present invention. This thrust bearing 32 differs from the one of FIG. 13 in that a hole 32f having a diameter larger then the width of the weir 32e is formed in the bearing layer 32a atop the weir 32e and the end 32d of each slit 32c. The hole 32f can be easily formed using a press or a lathe.

FIGS. 17 and 18 are respectively a plan view and a vertical cross-sectional view taken along Line XVIII—XVIII of another type of thrust bearing 33 which can be employed. The thrust bearing 33 is an annulus comprising a bearing layer 33a which is secured to a metal backing 33b by contact bonding. A plurality of T-shaped slits 33c are formed in the thrust bearing 33 by press working, each of the slits 33c extending from the top to the bottom of the bearing 33. The inner end of each slit 33c opens onto the center hole of the bearing 33, and some portion of each slit 33c communicates with one of the oil return holes 25 formed in the upper bearing frame 8.

FIGS. 19 and 20 are respectively a plan view and a vertical cross-sectional view taken along Line XX—XX of another type of thrust bearing 34 which can be employed in the present invention. It comprises a bearing layer 34a which is secured to a metal backing 34b by contact bonding. A plurality of spiral slits 34c are formed in the bearing 34 by press working, each of the slits 34c extending from the center hole of the bearing 34 partway towards the outer periphery of the bearing 34. Each of the slits 34c extends through the bearing 34 from top to bottom, and the outer end of each slit 34c coincides with an oil return hole 25 of the upper bearing frame 8.

FIGS. 21 and 22 are respectively a plan view and a vertical cross-sectional view taken along Line XXII—XXII of another type of thrust bearing 35 which can be employed. This bearing 35 is an annulus comprising a bearing layer 35a which is secured to a metal backing 35b by contact bonding. Four radial slits 35c which are formed in the bearing by press working extend between the center hole of the bearing 35 and an annular groove 35d which extends around the center hole. The depth of the radial slits 35c is equal to the thickness of the bearing 35, but the depth of the annular groove 35d is less than the bearing thickness. If the bearing layer 35c is made of a metal such as an aluminum alloy, for ease of manufacture, the annular groove 35d is preferably no deeper than the thickness of the bearing layer 35a so that it can be easily formed by press working. A plurality of through holes 35e are formed in the annular groove 35d down through the bottom of the bearing 35 in positions corresponding to the oil return holes 25 of the upper bearing frame 8. The difference in depth between the slits 35c and the annular groove 35d serves the same function as the weirs 32e of FIG. 14. Namely, lubricating oil can not flow into the through holes 35e unless the oil level in the radial slits 35c exceeds the height of the annular groove 35d. Therefore, an adequate amount of oil can be maintained in the slits 35c even when the compressor is operating at a low speed and oil is supplied to the bearing 35 at a reduced rate.

FIGS. 23 and 24 are respectively a plan view and a vertical cross-sectional view taken along Line XXIV—XXIV of another type of thrust bearing 36 which can be employed. The bearing 36 is an annulus which is formed by a bearing layer 36a and a metal backing 36b which are secured to one another by contact bonding. Four radial slits 36c which are formed in the bearing 36 by press working extend between the center hole of the bearing 36 and four circumferentially-extending grooves 36d which each extend partway around the center hole of the bearing 36. The depth of the radial slits 36c is equal to the thickness of the bearing 36, while the depth of the circumferentially extending grooves 36d is less than the bearing thickness. If the bearing layer 36a is made of an aluminum alloy or the like, the depth of the circumferentially extending grooves 36d is preferably no deeper than the thickness of the bearing layer 36a so that the circumferentially extending grooves 36d can be easily formed by press working. A through hole 36e is formed in each of the ends of the circumferentially extending grooves 36d down through the bottom of the bearing 36 in positions corresponding to the oil return holes 25 of the upper bearing frame 8. This thrust bearing 36 provides the same advantages as the thrust bearing of FIG. 21.

What is claimed is:

1. A scroll-type compressor comprising:
   a stationary scroll which comprises a disk-shaped, stationary end plate having a discharge port formed in the center thereof, and a stationary spiral wrap which extends perpendicularly from the bottom side of said stationary end plate and curves outwards from the center of said stationary end plate in the shape of a spiral;
   an orbiting scroll which comprises a disk-shaped, moving end plate, a moving spiral wrap which extends perpendicularly from the top side of said moving end plate and curves outwards from the center of said moving end plate in the shape of a spiral, and a shaft which extends perpendicularly from the bottom side of said moving end plate, said stationary end plate and said moving end plate being parallel with one another and said stationary spiral wrap and said moving spiral wrap being interfit with one another so as to form a plurality of spiral compression chambers;
   means for orbiting said orbiting scroll about the center of said stationary scroll;
   a bearing support frame having a plurality of oil return holes formed therein which extend between its top and bottom surfaces;
   an Oldham coupling which is supported by the top surface of said bearing support frame and which engages with said orbiting scroll so as to prevent said orbiting scroll from rotating on its axis while enabling it to orbit about the center of said stationary scroll;
   a disk-shaped thrust bearing which is supported by the top surface of said bearing support frame, said thrust bearing having a flat upper surface and a through hole at its center through which the shaft of said orbiting scroll extends, the bottom surface of said moving end plate resting on the upper surface of said thrust bearing, the lower surface of said thrust bearing surrounding the upper ends of said oil return holes and being in intimate contact with the top surface of said bearing support frame in a region surrounding the upper ends of said oil return holes, the diameter of said thrust bearing being smaller than the diameter of said moving end plate and of said Oldham coupling, the upper surface of said thrust bearing having a plurality of oil passageways formed therein whose inner ends communicate with said central hole and whose outer ends open onto said oil return holes and which do not extend to the outer periphery of said thrust bearing, said oil passageways being always covered by the bottom surface of said moving end plate; and
   means for supplying oil to the center hole of said thrust bearing.

2. A scroll-type compressor as claimed in claim 1 wherein said oil passageways comprise:
   a plurality of through holes which extend between the upper and lower surfaces of said thrust bearing, the bottom end of each of said through holes communicating with one of said oil return holes; and
   a plurality of outwardly-extending grooves which are formed in the upper surface of said thrust bearing, the inner ends of said outwardly-extending grooves opening onto the center hole of said thrust bearing and the outer ends communicating with said through holes and not extending to the outer periphery of said thrust bearing.

3. A scroll-type compressor as claimed in claim 2 wherein said oil passageways further comprise an annular groove which is formed in the upper surface of said thrust bearing and which extends between the outer ends of said outwardly-extending grooves and said through holes.

4. A scroll-type compressor as claimed in claim 3 wherein a by-pass groove which communicates between at least one of said outwardly-extending grooves and the outer periphery of said thrust bearing is formed in the upper surface of said thrust bearing.

5. A scroll-type compressor as claimed in claim 1 wherein said oil passageways comprise:
   a plurality of through holes which extend from the upper to the lower surface of said thrust bearing and which communicate with said oil return holes;
   a plurality of slits which extend through the depth of said thrust bearing and whose inner ends open onto said central hole and whose outer ends do not extend to the outer periphery of said thrust bearing; and
   at least one groove which is formed in the upper surface of said thrust bearing and which extends between the outer ends of said slits and said through holes, the depth of said groove being less than the depth of said thrust bearing.

6. A scroll-type compressor as claimed in claim 5 wherein said grooves and said slits are formed by press working.

7. A scroll-type compressor comprising:
   a stationary scroll which comprises a disk-shaped stationary end plate having a discharge port formed in the center thereof and a stationary spiral wrap which extends perpendicularly from the bottom side of said stationary end plate and curves outwards from the center of said stationary end plate in the shape of a spiral;
   an orbiting scroll which comprises a disk-shaped moving end plate, a moving spiral wrap which extends perpendicularly from the top side of said moving end plate and curves outwards from the center of said moving end plate in the shape of a spiral, and a shaft which extends perpendicularly from the bottom side of said moving end plate, said stationary end plate and said moving end plate being parallel with one another and said stationary spiral wrap and said moving spiral wrap being interfit with one another so as to form a plurality of spiral compression chambers;

means for orbiting said orbiting scroll about the center of said stationary scroll;

a bearing support frame having a plurality of oil return holes formed therein which extend between its top and bottom surfaces;

an Oldham coupling which is supported by the top surface of said bearing support frame and which engages with said orbiting scroll so as to prevent said orbiting scroll from rotating on its axis while enabling it to orbit about the center of said stationary scroll;

a disk-shaped thrust bearing which is supported by the top surface of said bearing support frame, said thrust bearing having a flat upper surface and a through hole at its center through which the shaft of said moving scroll extends, the bottom surface of said moving end plate resting on the upper surface of said thrust bearing, the lower surface of said thrust bearing surrounding the upper ends of said oil return holes and being in intimate contact with the top surface of said bearing support frame in a region surrounding the upper ends of said oil return holes, the diameter of said thrust bearing being smaller than the diameter of said moving end plate and of said Oldham coupling, the upper surface of said thrust bearing having a plurality of oil passageways formed therein whose inner ends communicate with said central hole and whose outer ends open onto said oil return holes and which do not extend to the outer periphery of said thrust bearing, said oil passageways being always covered by the bottom surface of said moving end plate, said oil supply passageways comprising a plurality of slits which are formed through the depth of said thrust bearing and which extend outwards from said central hole but do not extend to the outer periphery of said thrust bearing, each of said slits communicating with one of said oil return holes; and means for supplying oil to the center hole of said thrust bearing.

8. A scroll-type compressor as claimed in claim 7 wherein said slits are formed by press working.

9. A scroll-type compressor as claimed in claim 7 wherein each of said slits communicates with one of said oil return holes at a portion of said slit which is remote from said central hole.

10. A scroll-type compressor as claimed in claim 7 further comprising a weir which is disposed in each of said slits between said central hole and the portion of said slit which communicates with one of said oil return holes.

11. A scroll-type compressor as claimed in claim 10 further comprising a hole formed atop said weir and having a diameter larger than a width of said weir.

12. A scroll-type compressor as claimed in claim 11 wherein said hole is formed by press working.

* * * * *